United States Patent
Rausch et al.

(10) Patent No.: US 9,607,631 B2
(45) Date of Patent: Mar. 28, 2017

(54) ENHANCED CAPACITY RECORDING

(71) Applicant: Seagate Technology LLC, Cupertino, CA (US)

(72) Inventors: Tim Rausch, Farmington, MN (US); Minjie Ma, Bloomington, MN (US); Steven Granz, Shakopee, MN (US); Kaizhong Gao, North Oaks, MN (US); Wenzhong Zhu, Apple Valley, MN (US); Edward C. Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/950,577

(22) Filed: Nov. 24, 2015

(65) Prior Publication Data
US 2016/0148626 A1 May 26, 2016

Related U.S. Application Data

(60) Provisional application No. 62/083,696, filed on Nov. 24, 2014, provisional application No. 62/083,732, filed on Nov. 24, 2014.

(51) Int. Cl.
*G11B 5/09* (2006.01)
*G11B 5/012* (2006.01)
*G11B 11/105* (2006.01)
*G11B 5/00* (2006.01)

(52) U.S. Cl.
CPC ............... *G11B 5/09* (2013.01); *G11B 5/012* (2013.01); *G11B 11/10506* (2013.01); *G11B 11/10515* (2013.01); *G11B 11/10521* (2013.01); *G11B 11/10595* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,030,130 | A | 6/1977 | Smith |
| 4,298,897 | A | 11/1981 | Arter et al. |
| 4,535,372 | A | 8/1985 | Yeakley |
| 4,622,601 | A | 11/1986 | Isozaki et al. |
| 4,646,168 | A | 2/1987 | Sonobe et al. |
| 4,771,346 | A | 9/1988 | Shoji et al. |
| 4,803,571 | A | 2/1989 | Fujioka et al. |
| 4,853,799 | A | 8/1989 | Aikawa |
| 5,010,430 | A | 4/1991 | Yamada et al. |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — K. Wong
(74) *Attorney, Agent, or Firm* — Holzer Patel Drennan

(57) ABSTRACT

A storage device includes a storage controller configured to write a band of data tracks using a first recording method until criterion is met. The first method may be a conventional recording method. After the criterion is met, the storage controller is configured to write data to the band using a second recording method. The second recording method may be an enhanced capacity recording method such as interlaced magnetic recording (IMR) or shingled magnetic recording (SMR).

21 Claims, 4 Drawing Sheets

(56) References Cited

U.S. PATENT DOCUMENTS

| | | | |
|---|---|---|---|
| 5,285,341 A | 2/1994 | Suzuki et al. | |
| 5,402,270 A | 3/1995 | McDonnell et al. | |
| 5,760,993 A | 6/1998 | Purkett | |
| 5,892,634 A | 4/1999 | Ito et al. | |
| 5,978,168 A | 11/1999 | Mathews et al. | |
| 6,052,797 A | 4/2000 | Ofek et al. | |
| 6,104,562 A | 8/2000 | Ottesen et al. | |
| 6,185,063 B1 | 2/2001 | Cameron | |
| 6,710,960 B1 | 3/2004 | Yorimitsu | |
| 6,768,605 B2 | 7/2004 | Yamamoto | |
| 7,130,152 B1 | 10/2006 | Raymond et al. | |
| 7,259,927 B2 | 8/2007 | Harris | |
| 7,393,066 B2 | 7/2008 | Dugas et al. | |
| 7,440,222 B2 | 10/2008 | Nakamura et al. | |
| 7,573,682 B2 | 8/2009 | Pust et al. | |
| 7,872,829 B2 | 1/2011 | Sakai | |
| 7,907,360 B2 | 3/2011 | Mak et al. | |
| 7,957,093 B2 | 6/2011 | Brand | |
| 7,965,465 B2 * | 6/2011 | Sanvido | G11B 5/012 360/48 |
| 8,023,215 B1 | 9/2011 | Ghaly et al. | |
| 8,310,777 B2 | 11/2012 | Biskeborn et al. | |
| 8,310,782 B2 | 11/2012 | Song et al. | |
| 8,531,792 B1 | 9/2013 | Burd et al. | |
| 8,531,793 B2 | 9/2013 | Bandic et al. | |
| 8,537,481 B1 | 9/2013 | Bandic | |
| 8,599,510 B1 * | 12/2013 | Fallone | G11B 5/02 360/31 |
| 8,693,123 B1 | 4/2014 | Guo et al. | |
| 8,699,159 B1 | 4/2014 | Malina | |
| 8,699,162 B1 | 4/2014 | Grobis et al. | |
| 8,711,517 B2 | 4/2014 | Erden et al. | |
| 8,854,752 B2 | 10/2014 | Jin et al. | |
| 8,867,161 B2 * | 10/2014 | Emo | 360/58 |
| 8,873,178 B2 | 10/2014 | Erden et al. | |
| 8,913,335 B2 * | 12/2014 | Coker | G11B 5/012 360/135 |
| 8,917,469 B1 | 12/2014 | Guo et al. | |
| 8,929,186 B1 | 1/2015 | Sharma et al. | |
| 8,976,478 B1 | 3/2015 | Harllee, III et al. | |
| 9,053,712 B1 | 6/2015 | Guo et al. | |
| 9,058,829 B1 | 6/2015 | Wolf et al. | |
| 9,082,458 B1 | 7/2015 | Tang | |
| 9,087,541 B1 | 7/2015 | Pokharel et al. | |
| 9,099,103 B1 | 8/2015 | Krichevsky | |
| 9,105,302 B1 | 8/2015 | Erden et al. | |
| 9,111,575 B1 * | 8/2015 | Zhou | G11B 19/28 |
| 9,111,578 B1 | 8/2015 | Hassel et al. | |
| 9,129,658 B1 | 9/2015 | Yamamoto | |
| 9,142,246 B1 | 9/2015 | Trantham et al. | |
| 9,153,287 B1 | 10/2015 | Hamilton et al. | |
| 9,324,362 B1 | 4/2016 | Gao | |
| 9,396,062 B1 | 7/2016 | Sridhara et al. | |
| 9,418,688 B1 | 8/2016 | Rausch et al. | |
| 2002/0035666 A1 | 3/2002 | Beardsley et al. | |
| 2002/0035704 A1 | 3/2002 | Wilson | |
| 2002/0105867 A1 | 8/2002 | Tamaru et al. | |
| 2003/0214886 A1 | 11/2003 | Sakamoto et al. | |
| 2005/0078399 A1 | 4/2005 | Fung et al. | |
| 2005/0157597 A1 | 7/2005 | Sendur et al. | |
| 2006/0215511 A1 | 9/2006 | Shin et al. | |
| 2007/0047415 A1 | 3/2007 | Chang | |
| 2007/0050593 A1 | 3/2007 | Chen et al. | |
| 2007/0174582 A1 | 7/2007 | Feldman | |
| 2008/0002272 A1 | 1/2008 | Riedel | |
| 2008/0239901 A1 | 10/2008 | Tsunokawa et al. | |
| 2008/0316639 A1 | 12/2008 | Tang et al. | |
| 2009/0244775 A1 | 10/2009 | Ehrlich | |
| 2009/0251821 A1 | 10/2009 | Song et al. | |
| 2010/0014183 A1 | 1/2010 | Aoki et al. | |
| 2010/0027406 A1 | 2/2010 | Krause et al. | |
| 2010/0271727 A1 | 10/2010 | Namkoong et al. | |
| 2010/0321817 A1 | 12/2010 | Aida et al. | |
| 2012/0014013 A1 | 1/2012 | Bandic et al. | |
| 2012/0194946 A1 | 8/2012 | Watanabe et al. | |
| 2013/0148225 A1 | 6/2013 | Coker et al. | |
| 2013/0155826 A1 | 6/2013 | Zhang et al. | |
| 2013/0294207 A1 | 11/2013 | Erden et al. | |
| 2014/0016224 A1 | 1/2014 | Unoki et al. | |
| 2014/0043708 A1 | 2/2014 | Erden et al. | |
| 2014/0055881 A1 | 2/2014 | Zaharris | |
| 2014/0153134 A1 | 6/2014 | Han et al. | |
| 2014/0160589 A1 | 6/2014 | Deki et al. | |
| 2014/0285923 A1 | 9/2014 | Aoki et al. | |
| 2015/0178161 A1 | 6/2015 | Burd et al. | |
| 2016/0148630 A1 | 5/2016 | Rausch | |
| 2016/0148635 A1 | 5/2016 | Zhu et al. | |
| 2016/0148636 A1 | 5/2016 | Ma et al. | |
| 2016/0148637 A1 | 5/2016 | Rausch et al. | |
| 2016/0148642 A1 | 5/2016 | Gao | |
| 2016/0148643 A1 | 5/2016 | Gao et al. | |
| 2016/0148644 A1 | 5/2016 | Zhu et al. | |
| 2016/0148645 A1 | 5/2016 | Zhu et al. | |

FOREIGN PATENT DOCUMENTS

| | | |
|---|---|---|
| JP | H02-240862 A | 9/1990 |
| WO | 2005-030869 A1 | 4/2005 |

* cited by examiner

ENHANCED CAPACITY RECORDING

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014. All of these applications are specifically incorporated by reference for all that they disclose or teach.

BACKGROUND

Interlaced magnetic recording (IMR) generally refers to the concept of utilizing trimmed tracks and non-trimmed tracks with one or more selected written track widths or one or more different linear densities for data writes to alternating data tracks on a storage medium. A trimmed track is a track trimmed by two adjacent tracks written at given track pitch, while a non-trimmed track is a track not trimmed by any adjacent track. In these systems, data may be read from or written to the data tracks in a non-consecutive order. For example, data may be written exclusively to a first track series including every other data track in a region of a storage medium before data is written to any data tracks interlaced between the tracks of the first series.

Shingled magnetic recording (SMR) generally refers to the concept of writing data tracks consecutively in a manner such that each consecutive data track is written on top of an edge of the previous data track. In these systems, guard tracks may be included that do not include any user data, which may reduce read/write processing time.

SUMMARY

According to one implementation, a storage device comprises a storage media and a storage device controller configured to write data to a band of data tracks using a first recording method until a criterion is met. The first recording method may be a conventional recording method. After the criterion is met, the storage device controller is configured to write data to the band of data tracks on the storage media using a second recording method. In one implementation, some of the data racks written by the first recording method might need to be re-written by the second recording method. The second recording method may be a high capacity recording method such as IMR or SMR.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Enhanced capacity recording methods such as interlaced magnetic recording (IMR) and shingled magnetic recording (SMR) are used to increase the data capacity of storage media. However, these enhanced capacity recording methods come with read/write overhead. For example, writing to certain target tracks using an IMR or SMR method might entail reading a number of tracks into temporary memory before writing to the target track.

Conventional magnetic recording methods write data tracks such that each track is randomly writeable, meaning that any track can be written to and read from without having to read any adjacent data tracks or without significantly affecting the data on any adjacent data tracks. However, storage media using conventional magnetic recording (CMR) methods may not hold as much data as a storage media using an enhanced capacity method.

The herein-disclosed technology explores the convergence of conventional recording methods with enhanced capacity methods. Data tracks of a particular band may be written using a conventional method until a criterion is met, then the band may be written using an enhanced capacity method.

Figure 1:
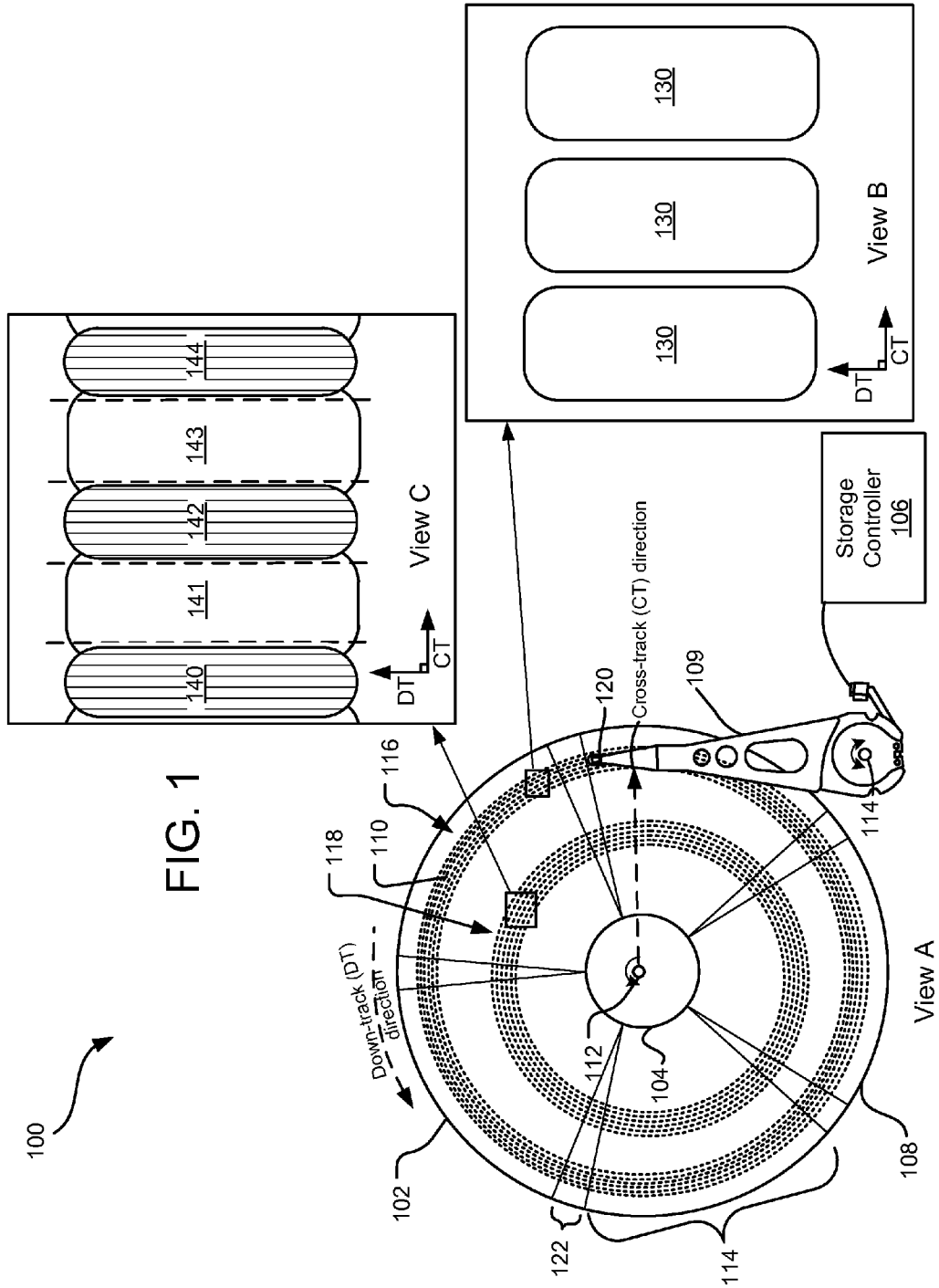
FIG. 1 illustrates a plan view of an example disc drive assembly.

FIG. 1 illustrates a plan view of an example disc drive assembly 100. Disc drive assembly includes a transducer head assembly 120 with a writer and reader (not shown) for writing and reading data to and from a magnetic storage medium 108. The transducer head assembly 120 may include a number of read and write configurations such as HAMR, multiple read and/or write heads, etc. Although other implementations are contemplated, the magnetic storage medium 108 is, in FIG. 1, a magnetic storage disc on which data bits can be recorded using a magnetic write pole and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The magnetic storage medium 108 includes a number of servo sectors (e.g., a servo sector 122) extending radially between the inter diameter 104 and the outer diameter 102. In one implementation, each of the servo sectors (e.g., servo sector 122) includes embedded information used for track seeking and track following. In particular, the information includes fine head position information used for centerline tracking Between every two consecutive servo sectors (e.g., servo sector 122) is a wedge (e.g., a wedge 114) that includes one or more bands (e.g., bands 116 and 118) of concentric data tracks 110. Each of the bands (e.g., band 116 and 118) includes one or more data tracks.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 112. The seek operation positions the transducer head assembly 120 over a target data track for read and write operations.

The disc drive assembly 100 further includes a storage controller 106. The storage controller 106 includes software and/or hardware, and may be implemented in any tangible processor-readable storage media within or communicatively coupled to the disc drive assembly 100. The term "tangible processor-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor. In contrast to tangible processor-readable storage media, intangible processor readable communication signals may embody processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

View B illustrates a magnified view of a section of the magnetic storage medium 108. Specifically, View B shows a section of a band, such as the band 116, including data tracks (e.g., data tracks 130) storing data according to a conventional magnetic recording (CMR) method. The data tracks 130 include a plurality of polarized regions (not shown), also referred to as "data bits," each representing one or more individual data bits of the same state (e.g., is or 0s). Each track in a CMR system is randomly write-able, meaning that any data track 130 may be re-written without significantly affecting an adjacent data track. However, due to the spacing between each data track 130, data capacity is smaller than systems using an enhanced capacity recording method, discussed further below.

In a same or different implementation, the data tracks 130 in view B may be written closer together than generally implemented in CMR systems. In this example implementation, more data can be fit into a particular band than could be done using a CMR system because the tracks are written closer together.

View C illustrates a magnified view of a section of the magnetic storage medium 108. Specifically, View C shows a section of another band, such as the band 118, including data tracks (e.g., data tracks 140, 141, 142, 143, 144) storing data according to an enhanced capacity recording method, specifically an Interlaced Magnetic Recording (IMR) method. The illustrated IMR method utilizes alternating data tracks of trimmed and non-trimmed tracks written with same or different track widths. The data tracks are arranged with slightly overlapping written track boundaries so that a center-to-center distance between directly adjacent tracks (e.g., the track pitch) is uniform across an area (e.g., a radial zone or across an entire surface of the magnetic storage medium 108).

Specifically, View C illustrates a first series of alternating tracks (e.g., the tracks 141 and 143) with a wider written track width than a second series of alternating data tracks (e.g., the tracks 140, 142, and 144). The first series of alternating tracks (e.g., tracks 141 and 143) are written before the second series and are referred to as "bottom tracks." The second series (e.g., tracks 140, 142, and 144) of alternating tracks are written on top of and interlaced with the bottom tracks and are referred to as "top tracks." The tracks of the first series of alternating tracks (e.g., tracks 141 and 143) are wider because they are written using a larger linear density (e.g., kbpi). In some implementations, linear density is increased at the expense of track density (e.g., ktpi). The second series of alternating tracks (e.g., tracks 140, 142, and 144) use a smaller linear density (kbpi) than the first series of alternating tracks.

According to one implementation, each wide data track (i.e., bottom track) of the first series is written before the data is written to any directly-adjacent data tracks (i.e., top tracks) of the second series. For example, the data track 141 is written before data is written to either of the data tracks 140 and 142. Data writes to the data tracks 140 and 142 may subsequently overwrite outer edge portions of the data track 141; however, the data track 141 is still readable due to sufficient information retained in a center region of the data track 141. Because the outer edge portions of data tracks (e.g., data track 141) may be overwritten, bottom tracks may also be referred to as "trimmed" tracks. The tracks (e.g., data track 142) that may overwrite the outer portions may also be referred to as "non-trimmed" tracks, because their edges may not be subsequently overwritten.

One consequence of IMR is that a bottom track (e.g., a data track 141) is not randomly writable when data is stored on a directly adjacent top track (e.g., the data track 140 or 142). As used herein, a data track is "randomly writable" when the data track can be individually re-written multiple times without having to read in an adjacent data track into memory before each write. For example, over-writing bottom track 141 entails (1) reading the top tracks 140 and 142 into a temporary cache location; (2) writing the bottom track 141; and (3) re-writing top tracks 140 and 142 after the write of the bottom track is complete. As a result, a significant read/write overhead exists in IMR systems.

Other enhanced capacity recording methods are contemplated. For example, band 116 might be written using a Shingled Magnetic Recording (SMR) method. In SMR systems, data tracks are layered on top of one another such that a first track is written; a second track is written with an edge of the track on top of the first track; and a third track is written with an edge on top of the second track, etc. SMR systems also have tradeoffs. For example, in the above system, re-writing the first track would entail: (1) reading the third and second track into memory; (2) writing the first track; (3) writing the second track with an edge on top of the first track; and (4) writing a third track with an edge on top of the second track. SMR systems might use one or more guard tracks to decrease read/write processing times. Guard tracks are tracks without user data left between a grouping of shingled tracks. A guard track may decrease the amount of tracks that need to be read into memory before writing one of the tracks that are at or near the "bottom" of the shingled tracks.

Because enhanced capacity recording methods have tradeoffs between the amount of data and increased read/write times, a system that uses both CMR and enhanced recording method(s) is contemplated. For example, in View B data tracks (e.g., data tracks 130) of a band (e.g., band 116) may be initially written using a first recording method such as conventional magnetic recording or a method that writes data tracks close together. While the band is being written to and read from using this first method, the tracks may be randomly writeable. However, once a criterion is met, then the band may be read into memory then re-written using an enhanced capacity recording method. Thus, more data can be written to data tracks of band 116 using the enhanced capacity recording method.

Storage controller 106 may implement a prioritized write management scheme to ensure that bands of adjacent data tracks are written in an order such that all tracks are readable and a total read/write processing time is mitigated. The write management scheme may govern data writes to an entire magnetic disc, or (alternatively) govern data writes to a subset of a magnetic disc, such as a radial zone, different bands, or partitioned storage area of the magnetic disc.

According to one implementation, the write management scheme includes multiple phases, with different write prioritization rules applied during each distinct phase. In a first phase of the write management scheme, data is written to a plurality of data tracks on different bands using a first recording method such as CMR or another method. During this first phase, the data tracks are randomly writeable, and read/write processing speed is faster than that of the second phase of the write management scheme (discussed below). The first phase of reading/writing data tracks on a band continues until a criterion is met.

After the criterion is satisfied, a second phase of the write management scheme commences. When the second phase commences, a band of data tracks (e.g., band 116) may be read into temporary memory then re-written according to an enhanced capacity recording method such as IMR or SMR. During the second phase of the write management scheme, the band's data capacity may be significantly greater than the data capacity of the band during the first phase of the write management scheme. However, the read/write processing speed may be lower because data tracks may not be randomly writeable.

In one implementation, the criterion is based on a capacity threshold. For example, the capacity threshold may be 95% data capacity of a band, meaning that the first phase of the write management scheme continues until a band is at 95% data capacity when using the first recording method. After the data capacity reaches 95% the second phase of the write management scheme will start, and data is written to the band using a second recording method.

In the same or a different implementation, the criterion is based on a capacity threshold and the first recording method is a method that writes a first set of tracks (e.g., the bottom tracks 141 and 143) of an IMR system close together. For example, the first set of tracks are written so close together that there may not be enough room to write top tracks on top of the bottom tracks (e.g., interlaced with the bottom tracks) without affecting the data of the bottom tracks. Therefore, the first recording method will continue until the capacity threshold is met. Once the capacity threshold is met, all of the first set of tracks will be read into memory then re-written using the IMR method wherein a larger space is included between a first set of tracks. Thereafter, a second set of tracks is written on top of the first set (e.g., the second set is interlaced with the first set). This example implementation ensures that the data capacity is maximized during the first recording method until the capacity threshold is met. Using this example implementation, there may exist an optimal capacity threshold as explained hereinafter.

There are two different track pitches: normal recording, $ktpi_N$, and IMR recording, $ktpi_I$. There are two different linear densities: normal recording, $kbpi_N$, and IMR recording, $kbpi_I$, where $kbpi_I=(kbpi_b+kbpi_t)/2$, with $kbpi_b$ and $kbpi_t$ being the bottom and top linear densities, respectively. For the same drive, the capacity differences between the two recording methods are the ratio:

$$\frac{Capacity_{Normal}}{Capacity_{IMR}} = \frac{ktpi_N \times kbpi_N}{ktpi_I \times kbpi_I}$$

so, $$Capacity_{IMR} = \frac{ktpi_I \times kbpi_N}{ktpi_N \times kbpi_N} \times Capacity_{Normal}$$

If it is assumed, $$l = ktpi_N / kbpi_I$$

and $$m = kbpi_N / kbpi_I,$$

then $$Capacity_{IMR} = \frac{1}{lm} \times Capacity_{Normal}$$

Therefore, 95% of the band can be filled with a first set of bottom tracks before the drives need to be read into memory and re-written using an IMR method. To figure out how many of the first set of tracks need to be re-written after the capacity threshold is met, the data must be conserved in the same amount of space but leaving one track empty. The following equations exist:

$$\text{Data Conservation: } n \times kbpi_N = (x \times kbpi_b) + (y \times kbpi_t)$$

$$\text{Space Conservation: } \frac{n}{ktpi_N} = \frac{x+y+1}{ktpi_I}$$

Where n is the number of tracks in normal recording, x is the number of bottom tracks needed in IMR recording, and y is the number of top tracks needed in an IMR recording. Assuming the linear densities ratio of bottom track to top track is $$k = \frac{kbpi_b}{kbpi_t}$$

Then there exist some restrictions on l, m and k:

Restriction I (from linear density): $kbpi_N > kbpi_b$, which implies $$m > \frac{2}{1+k}$$

Restriction II (in terms of ADC): $ktpi_N \times kbpi_N < ktpi_I \times kbpi_I$, which implies $lm<1$ If the last track in IMR recording is a top track, then $$y = x - 1,$$

therefore $$n = \frac{2l}{(k+1)(1-ml)}$$

If the last track in the IMR method is a bottom track, then y=x−2, therefore $$n = \frac{(3-k)l}{(k+1)(1-ml)}$$

There exists a special case when: $kbpi_N = kbpi_b$, then $m = 2k/(k+1)$, and $$k = \frac{kbpi_b}{kbpi_t} = 1,$$

then $m=1$, and $$n = \frac{1}{1-l}.$$

Therefore if $$k = \frac{kbpi_b}{kbpi_t} = 1,$$

then the normal recording track pitch is 5% smaller than the IMR track pitch, but the same linear density. Therefore, 19 normal recording racks would need to be read into memory and re-written using the IMR method to make room for the additional data (over 95%).

In other implementations, the criterion may be based on latency of a band, the data heat of a band, or the type of data. Latency of a given data track is the time it takes to read or write data to that given track. For example, the criterion may be based on the latency of the data track so that when the latency is above a threshold, a different recording method may be more efficient. For example, if the data does not require a high data latency and does require more capacity, then the data may be written using an enhanced capacity method such as IMR or SMR. Data heat is the amount of read/writes to a particular band. For example, a band that receives a large number of read/writes compared to other bands has a high data heat. On the other hand, a band that receives a low number of read/writes compared to other bands has a low data heat. When the criterion is based on data heat, a band with a low data heat might enter the second phase of the write management scheme earlier than a band with a higher data heat. In this example, because the band with low data heat has a lower number of read/writes, the tradeoff between capacity and read/write time is minimized (e.g., the band can be used to hold more data without significantly effecting read/write time).

In the same or a different implementation, the criterion might be based on the type of data. For example, if data is very valuable (e.g., data utilized by the operating system), then this data may be written to bands using only CMR methods. CMR methods are usually more reliable because portions of the tracks are not written over by adjacent data tracks as they are in some high capacity recording methods. However, if the data is not considered valuable, then the data may be written to bands using a high capacity recording method, thereby maximizing the amount of data that can be stored on the storage medium. In an example implementation using the data type based threshold, if the storage controller is storing high value data using CMR and receives an indication that the data is of a lesser value, the storage controller may change the recording from the CMR method to one of the enhanced capacity methods, such as IMR, SMR, etc.

The criterion may be selected by the storage controller based on the write management scheme implemented by the storage controller. The criterion may also be defined by a user of the storage system. For example, the user might define the criterion by defining the security levels of the data.

The above-described data management techniques can be used to increase storage media area for storing user data and storage density. Storage area and density gains for storage systems are described further with respect to the following figures.

Figure 2:
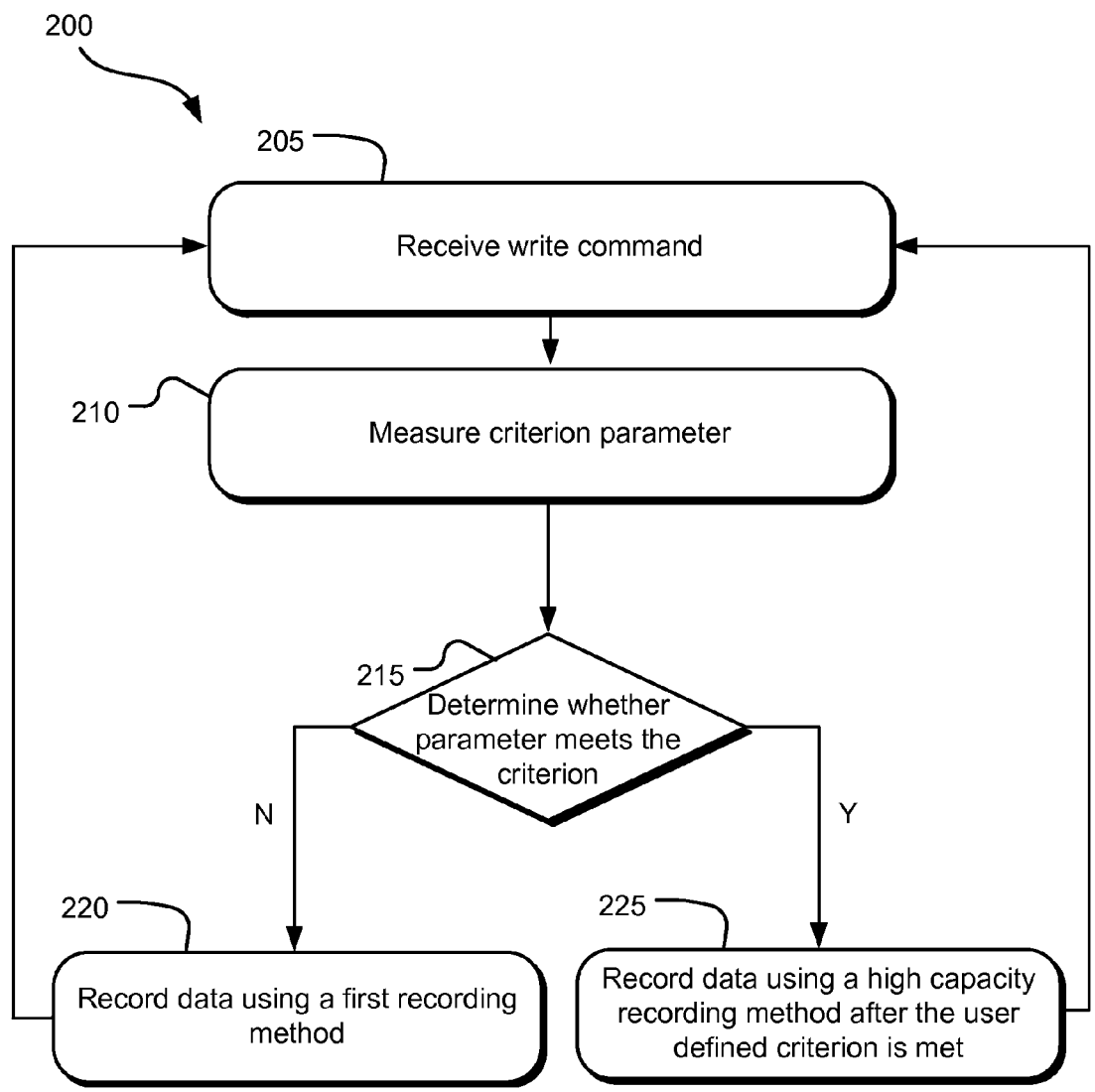
FIG. 2 illustrates example operations for writing to a magnetic disc in an enhanced capacity recording system.

FIG. 2 illustrates example operations 200 for writing to a magnetic disc in an enhanced capacity recording system. The operations 200 may be performed and/or controlled by a storage controller, which includes a processor. The controller may control the location of read and writes according to a write management scheme and a criterion. A receiving operation 205 receives a write command. The write command may come from a host machine connected to the storage device. The write command may include the data to be written and a location on the media of the storage device to write the data. On the other hand, the controller may select the location to write the data according to the write management scheme.

A measuring operation 210 measures the criterion parameter. Such criterion parameter may be user defined or selected by the storage controller. The measuring operation 210 may measure the criterion parameter after receiving the write command or it may continuously monitor or poll the value of such parameter and store it on a memory on the storage controller. For example, if the criterion used to determine when to switch from one recording method to another recording method is data capacity, the measure operation 210 measures the amount of data in a particular band to determine how much additional data may be stored in that band.

A determine operation 215 uses the measured value of the criterion parameter to determine whether the measured parameter meets the criterion. If the criterion is not met, then record operation 220 records the data using a first recording method, such as CMR. If the criterion is met, then record operation 225 records data using a second recording method, such as a high capacity recording method (e.g., IMR or SMR). When a subsequent write command is received, the operations 200 starts over with receive operation 205. If a band is selected to write that has already been written to using the second recording method (i.e., already in the second phase of the write management scheme), then measure operation 210 and compare operation 215 may be skipped and record operation 225 may be used to continue to write data using the high capacity recording method.

Figure 3:
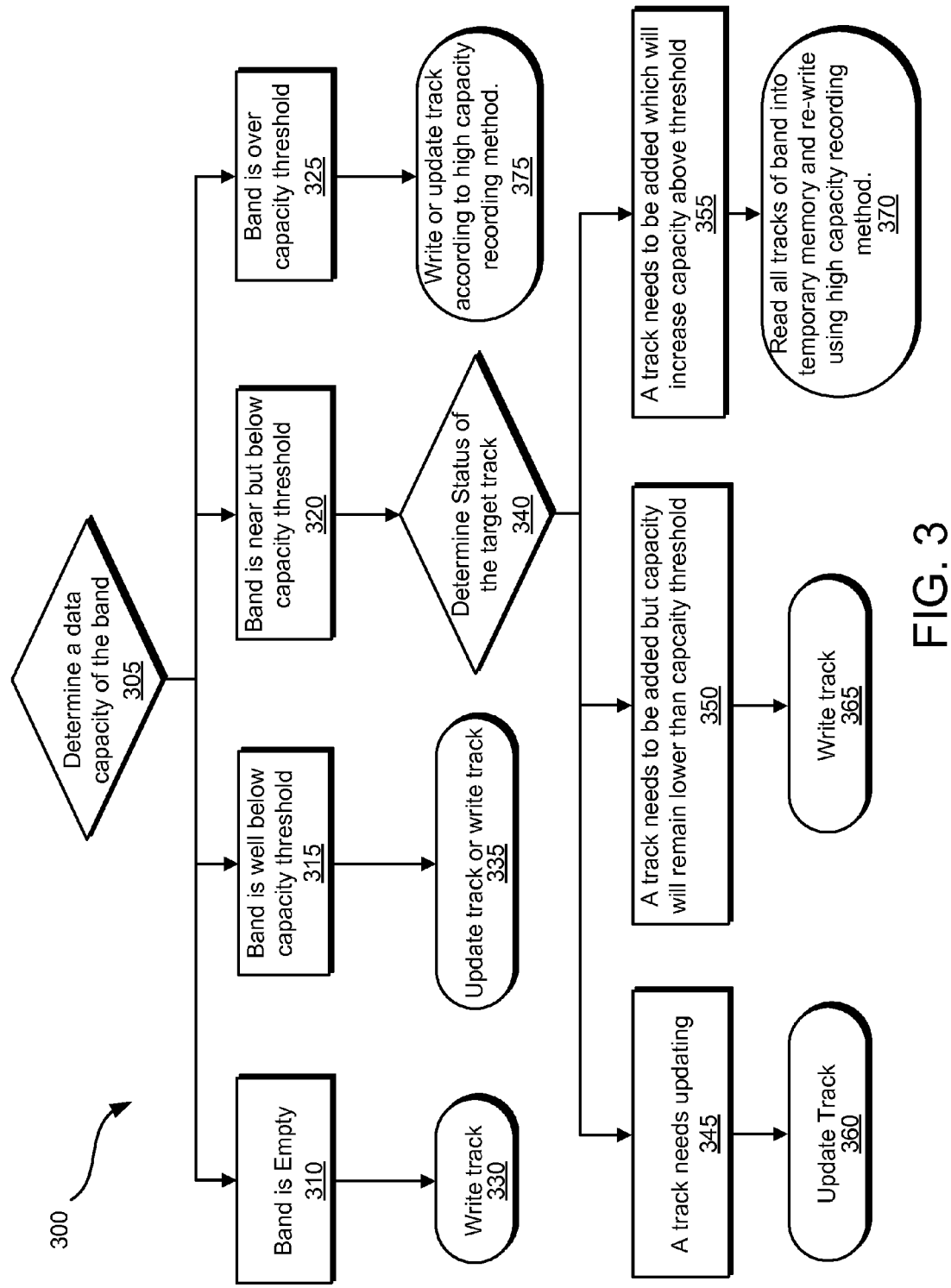
FIG. 3 illustrates another example of operations for writing to a magnetic disc in an enhanced capacity recording system.

FIG. 3 illustrates another example of operations 300 for writing to a magnetic disc in an enhanced capacity recording system. Specifically, FIG. 3 illustrates operations 300 for writing using an enhanced capacity recording system with a criterion based on a capacity threshold. Generally, if the data capacity of a particular band is well below the threshold, then the system may use a conventional magnetic recording method to write data tracks to the band. However, if the data capacity is above the threshold, then the system will use a high capacity recording method. Determining operation 305 determines the data capacity of a target band. The data capacity may be determined by reading the amount of data within the target band, or the data capacity might be tracked in a separate table or other tracking method. The determining operation 305 may have four possible outcomes (e.g., outcomes 310, 315, 320, and 325).

If the determining operation 305 determines that the target band is empty (e.g., outcome 310) then writing operation 330 writes the data track to the band using a conventional magnetic recording (CMR) method. If the determining operation 305 determines that the target band is well below the capacity threshold (e.g., outcome 315), then the operation 335 writes the data to the data track or updates the target track accordingly. If determining operation 305 determines that the target band is near but below the capacity threshold (e.g., outcome 320), then determining operation 340 determines the status of the target track of the target band. The determining operation 340 may have three possible outcomes (e.g., outcomes 345, 350, and 355).

If determining operation 340 determines that a target track needs updating (e.g., outcome 345), then updating operation 360 updates the track according to the CMR method. If determining operation 340 determines that a track needs to be added to the target band, but the addition of the band will not increase the data capacity of the target band above the capacity threshold (e.g., outcome 350), writing operation 365 writes the data track according to the CMR method. If determining operation 340 determines that a track needs to be added to the target band and the added track will increase the data capacity above the capacity threshold, then reading/writing operation 370 reads all of the data tracks of the target band into temporary memory and re-writes all of the data tracks and the new track according to a high capacity recording method such as Shingled Magnetic Recording (SMR) or Interlaced Magnetic Recording (IMR).

If determining operation 305 determines that the target band is over the capacity threshold (e.g., outcome 325 wherein the band is already being read from and written to using a high capacity recording method), then write/update operation 375 writes or updates the target track of the target band according to the high capacity recording method.

Figure 4:
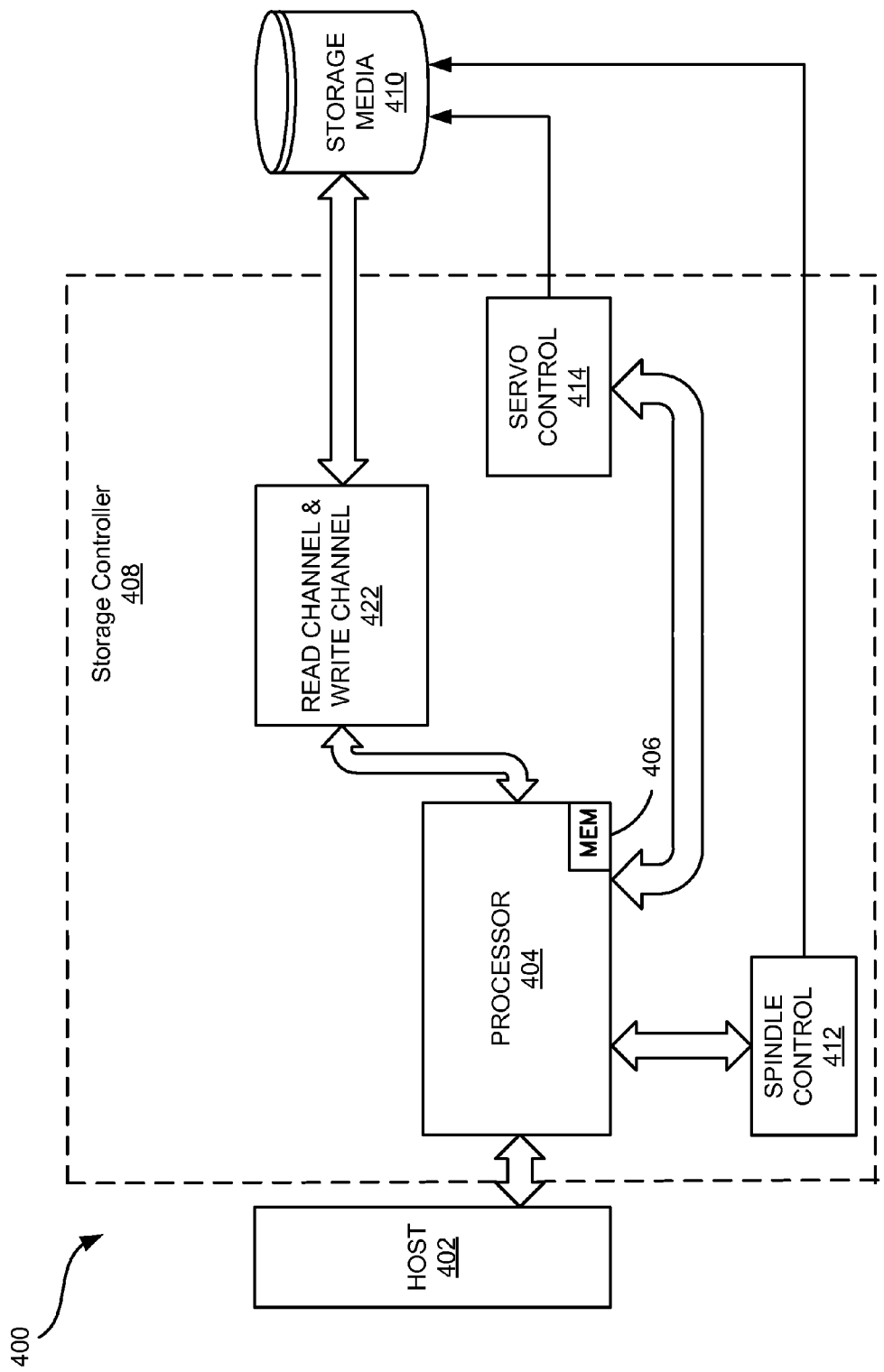
FIG. 4 illustrates an example schematic of storage controller of a disc drive assembly.

FIG. 4 illustrates an example schematic 400 of a storage controller 408 of a disc drive assembly. Specifically, FIG. 4 illustrates one or more functional circuits that are resident on a printed circuit board used to control the operation of the disc drive. The controller 408 is operably and communicatively connected to a host computer 402. Control communication paths are provided between the host computer 402 and a processor 404. Control communication paths are provided between the processor 404 and storage media 410 via a number of read/write channels (e.g., read channel and write channel 422). The processor 404 generally provides top-level communication and control for the controller 408 in conjunction with processor readable instructions for the processor 404 encoded in processor readable storage media 406. The processor readable instructions comprise instructions for controlling writing to and reading from data tracks on a storage media 410. The processor readable instructions further include instructions for reading and writing data tracks according to the enhanced capacity recording method described herein.

The term "processor readable storage media" includes but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor. In contrast to tangible processor-readable storage media, intangible processor-readable communication signals may embody processor readable instructions, data structures, program modules or other data resident in a modulated data signal, such as a carrier wave or other signal transport mechanism. Note that while, the system for management of system files on a storage device is disclosed herein in context of an HDD, one or more aspects of the technology disclosed herein may also be applicable to other storage devices enumerated above.

The storage controller 408 controls storage of data on the storage media 410, such as magnetic disc, optical discs, etc. A spindle motor control circuit 412 controls the rotation of storage media 410. A servo circuit 414 provides control for moving an actuator that moves heads (not shown) between tracks on the storage media 410 and controls the position of the head.

Other configurations of storage controller 408 are contemplated. For example, storage controller 408 may include one or more of an interface circuitry, a buffer, a disc drive platform buffer manager (PBM), a formatter, etc. The processor readable instructions may be included on the host computer or somewhere else on a storage system.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device, comprising:
a storage media; and
a storage device controller configured to:
write data to one or more data tracks of a target band on the storage media using a first recording scheme,
monitor the target band to determine whether a criterion has been satisfied;
read the one or more data tracks of the target band into a memory met responsive to a determination that the criterion has been satisfied; and
write the one or more data tracks to the target band on the storage media using a second recording scheme different from the first recording scheme.

2. The storage device of claim 1 wherein the storage device controller is further configured to measure a parameter of the target band to evaluate the criterion.

3. The storage device of claim 1, wherein the second recording scheme is at least one of interlaced media recording (IMR) and shingled media recording (SMR).

4. A method comprising:
receiving a command to write data to a track of a target band, the target band having recorded data using a first recording scheme;
determine whether a criterion is satisfied in the target band; and
responsive to a determination that the criterion is met, recording the write data to the target band using a second recording scheme, wherein the second recording scheme is different from the first recording scheme.

5. The method of claim 4, further comprising:
measuring a parameter of the target band determine whether the criterion is satisfied.

6. The method of claim 4, further comprising:
reading one or more data tracks of the target band into a memory and recording the write data and the one or more read data tracks using the second recording scheme.

7. The method of claim 4, wherein the criterion is based on a capacity threshold of the target band, the method further comprising:
responsive to a determination that the write data will increase the target band capacity above the capacity threshold, reading recorded data one or more tracks of the target band into memory before recording the write data and recorded data to the target band using the second recording scheme.

8. The method of claim 4, wherein the criterion is based on latency of the target band.

9. The method of claim 4, wherein the criterion is based on data heat of the target band.

10. The method of claim 4, wherein the criterion is based on data capacity threshold of the target band.

11. The method of claim 4, wherein the criterion is based on a data type of the write data.

12. The method of claim 4, wherein the second recording scheme is a high capacity recording scheme.

13. The method of claim 12, wherein the high capacity recording scheme is at least one of interlaced magnetic recording (IMR) and shingled magnetic recording (SMR).

14. One or more non-transitory processor-readable storage media encoding computer-executable instructions for executing on a storage device a computer process, the computer process comprising:
recording data to a target band of one or more data tracks using a first recording scheme; and
responsive to a determination that a criterion is satisfied in the target band of one or more data tracks, recording the data to the target band of one or more data tracks using a second recording scheme, the second recording scheme being different from the first recording scheme.

15. The one or more processor-readable storage media of claim 14, further comprising:
measuring a parameter of the target band to determine whether the criterion is satisfied.

16. The one or more processor-readable storage media of claim 14 further comprising:
reading one or more data tracks of the target band into memory; and
writing the one or more data tracks using the second recording scheme.

17. The one or more processor-readable storage media of claim 14, wherein the criterion is based on at least one of a latency of the target band, data heat of the target band, a data capacity threshold of the target band, and a data type of the data.

18. The one or more processor-readable storage media of claim 14, wherein the criterion is selected by a storage controller based on a write management scheme implemented by the storage controller.

19. The one or more processor-readable storage media of claim 14, wherein the criterion is selected by a user of the storage device through defining a security level of the data.

20. The one or more processor-readable storage media of claim 13, wherein the second recording scheme is at least one of interlaced magnetic recording (IMR) and shingled magnetic recording (SMR.

21. The one or more processor-readable storage media of claim 14, wherein the first recording scheme is a conventional recording scheme.

* * * * *